DIGITAL DEMODULATOR FOR FREQUENCY-SHIFT KEYED SIGNALS

Filed Sept. 25, 1961 8 Sheets-Sheet 1

INVENTOR
R. O. SOFFEL
BY
Charles Scott Phelan
ATTORNEY

Jan. 18, 1966 R. O. SOFFEL 3,230,457

DIGITAL DEMODULATOR FOR FREQUENCY-SHIFT KEYED SIGNALS

Filed Sept. 25, 1961 8 Sheets-Sheet 2

INVENTOR
R. O. SOFFEL
BY
Charles Scott Phelan
ATTORNEY

INVENTOR
R. O. SOFFEL
BY
Charles Scott Phelan
ATTORNEY

DIGITAL DEMODULATOR FOR FREQUENCY-SHIFT KEYED SIGNALS

Filed Sept. 25, 1961 8 Sheets-Sheet 4

INVENTOR
R. O. SOFFEL
BY
Charles Scott Phelan
INVENTOR

INVENTOR
R. O. SOFFEL
BY
Charles Scott Phelan
ATTORNEY

DIGITAL DEMODULATOR FOR FREQUENCY-SHIFT KEYED SIGNALS

Filed Sept. 25, 1961 8 Sheets-Sheet 6

INVENTOR
R.O.SOFFEL
BY
Charles Scott Phelan
ATTORNEY

Jan. 18, 1966 R. O. SOFFEL 3,230,457

DIGITAL DEMODULATOR FOR FREQUENCY-SHIFT KEYED SIGNALS

Filed Sept. 25, 1961 8 Sheets-Sheet 7

INVENTOR
R. O. SOFFEL
BY
Charles Scott Phelan
ATTORNEY

DIGITAL DEMODULATOR FOR FREQUENCY-SHIFT KEYED SIGNALS

Filed Sept. 25, 1961 8 Sheets-Sheet 8

INVENTOR
R. O. SOFFEL
BY
Charles Scott Phelan
ATTORNEY 3,230,457
DIGITAL DEMODULATOR FOR FREQUENCY-SHIFT KEYED SIGNALS

Robert O. Soffel, Hastings on Hudson, N.Y., assignor to Bell Telephone Laboratories, Incorporated, New York, N.Y., a corporation of New York

Filed Sept. 25, 1961, Ser. No. 141,250
12 Claims. (Cl. 325—320)

This invention relates to an electric signal demodulator; and, more particularly, it relates to a demodulator for converting frequency shift-data signals into pulse data signals.

Data signals comprise bits of information that may be represented by pulse signals of two or more amplitudes arranged in data words in different permutations of a code to represent conventional letters, numbers, or other prearranged symbols. In one scheme which is common in data systems, the data bits are designated "mark," "space," or "ready," depending upon the amplitude of the data pulse. Each data word or group of words may be preceded by a start code to prepare data receiving equipment for operation.

In data transmission systems for communicating between data processing terminals, one perennial problem is the problem of overcoming the effects on transmission accuracy of such factors as noise and delay. Some improvement in transmission accuracy in the presence of noise may be realizer by using the different pulse amplitudes for modulating the frequency of a carrier oscillation rather than sending the raw pulses between transmission terminals. In such a frequency modulated, or frequency-shift, system there appear on the tranmission line between terminals sequential bursts of oscillations of different frequencies representing, respectively, mark, space, or ready data bits, or other types of bits that may be convenient. At the receiving station, the frequency-shift signals must be restored to their original pulse form, but it is in performing this function that a number of significant difficulties make themselves apparent.

One demodulation problem is that of obtaining a clock timing voltage in synchronism with the data for use with the data in circuits supplied by the demodulator. For reasons of economy in using the available bandwidth of a transmitting circuit, it is advantageous to avoid the use of separate channels for the transmission of the data and timing signals. And in order that the transmission system itself should not be limited to use with any particular pair of data processing terminals, it is advantageous that it be able to provide a timing output wave in synchronism with the received data wave even though the received data wave may not be in synchronism with the various oscillation frequencies representing the different data bits. Accordingly, a timing recovery scheme is usually employed which is synchronized by data transitions between bits of different types, e.g., mark-to-space of ready-to-mark transitions.

Analog demodulation equipment may be capable of defining the occurrence time of the data transitions with sufficient accuracy to permit the use of the transitions for timing recovery. However, analog equipment usually requires the use of direct-current amplification to obtain sufficient sensitivity for distinguishing the different data bits in the presence of noise; and direct-current amplifiers have the well-known problems of adjustment and drift.

Digital demodulations equipment, such as a period detector, or frequency counter, does not need the direct-current amplification to distinguish the different bit types. However, digital equipment has not previously been capable of defining data transitions sufficiently accurately to permit their use for timing recovery.

It is, therefore, one object of the invention to improve timing recovery techniques for frequency-shift demodulators.

Another object is to reduce the influence of noise on the operation of a data demodulator.

An additional object is to demodulate frequency-shift data signals by employing improved digital techniques.

A further object of the invention is to recover data signal timing from an asynchronous, frequency-shift data signal.

Still another object is to eliminate time base jitter in the data output of a frequency-shift digital demodulator.

These and other objects of the invention are realized in an illustrative embodiment wherein two reversible binary counters are arranged as an integrator to adjust the counting levels attained by one another during each half-period interval of a received frequency-shift data wave. During a first part of each interval, the count in a first one of the binary counters, the data counter, is shifted into the second binary counter, the rate computer. The rate computer counts high frequency oscillations at a fixed frequency until at the end of the interval the counting operation is stopped. Output voltages derived from the rate computer are then employed to set the input of the data counter for counting in the same direction that the rate computer was counting just prior to the end of the interval. These voltages also cause the data counter to operate at a rate which is a function of the magnitude of the rate computer count. Subsequently, the data counter operates at its newly prescribed rate, and in the indicated direction, until a time just prior to the aforementioned shift of its count into the rate computer.

Data pulse output signals are derived from the last stage of the data counter. The phase of a data start pulse preceding each data word so derived is compared with the phase of the local clock signal. This comparison yields signals which may be employed to make clock phase adjustments of a fraction of a cycle at a time to maintain synchronism with the data. The phase corrected clock signal then controls a sampling gate for coupling derived data to a suitable utilization circuit.

It is one feature of the invention that the aforementioned combination of binary counters constitutes a digital, equivalent, low-pass filter which gives the demodulator a high degree of immunity to noise distortion and to jitter in timing recovery.

Another featured aspect of the demodulator in accordance with the invention is the use of means which are responsive to the size and direction of changes in the length of the period of frequency-shift data signals for reproducing data transistions at substantially stable times with respect to a time base signal.

Another feature of the invention is that the failure of start pulses for a predetermined time interval causes the demodulator automatically to enable its timing circuits to be reset for synchronized operation in response to the first-occurring start pulse.

A further feature is a combination of counters and logic circuits for detecting the presence of a predetermined data start code and developing a start pulse in synchronism with the data following the start code.

Yet another feature of the invention is the use of unique logic circuits for rapidly adjusting the phase of a clock voltage wave which is derived from the output of a stable oscillator.

A more complete understanding of the invention and the various objectives, features, and advantages thereof may be obtained from a consideration of the following detailed description taken together with the appended claims and the attached drawings, in which:

Figure 1:
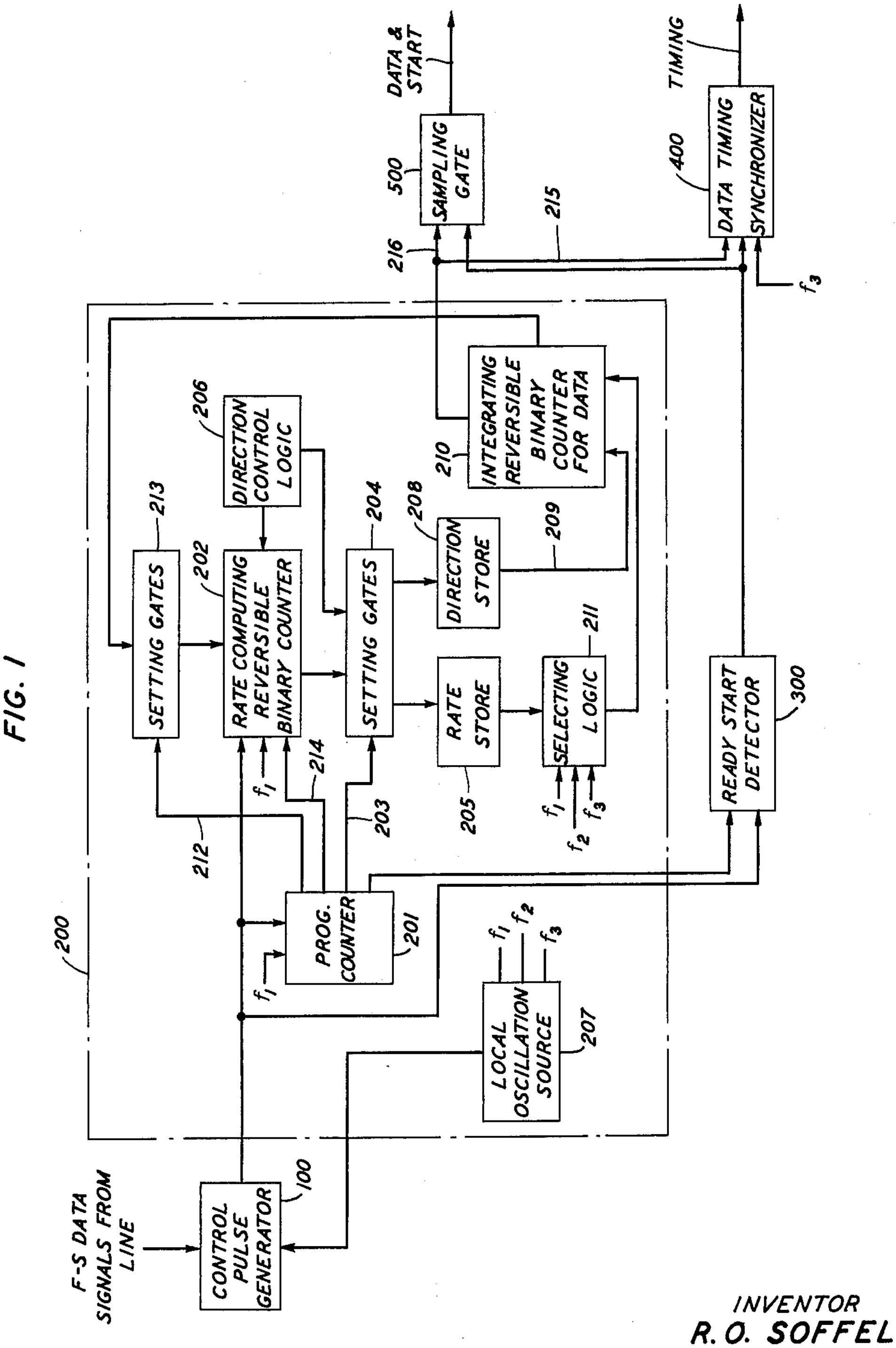
FIG. 1 is a simplified, functional, block and line diagram of a digital demodulator in accordance with the invention.

In order to facilitate cross reference between the simplified diagram of FIG. 1 and the details of that diagram presented in FIGS. 6 through 10, an interlocked numbering plan is employed for reference characters. The major functional blocks in the diagram of FIG. 1 have beeen assigned reference characters indicating number series of 100 numbers each. Detailed structures in each of these major functional blocks bear reference characters within the number block assigned in accordance with FIG. 1.

*Over-all demodulator*

In FIG. 1, frequency-shift data signals from a transmission line may include a data word, or a group of words, preceded by a start code. These signals are applied to a circuit 100 for extracting from said signals a train of control pulses, hereinafter designated "C pulses," which coincide with the occurrence of some particular characteristic of each cycle of the frequency-shift signal. In a typical case, this characteristic may be the zero-voltage axis-crossing of the carrier oscillations in the line signal. Thus, each cycle of the incoming line signal would cause the production of two C pulses. It is assumed in the illustrative embodiment of the invention that the data was originally generated in synchronism with a clock signal, but that such signal is not available at the demodulator and that there is no synchronous relationship between that clock signal and the bit frequencies of the frequency-shift data wave.

C pulses from generator 100 are applied to a digital, equivalent, low-pass filter, or integrator, circuit 200, wherein changes in the durations of successive intervals between control pulses are detected and utilized to produce a pulse data signal. C pulses are also applied to a ready-start detector 300, which is designed to indicate the occurrence of a particular combination of ready, mark, and space signals that may precede each data message applied to the demodulator input. When such a combination is detected, a voltage signal is applied to a timing and phase control circuit 400 and to a data sampler 500.

Figure 2:
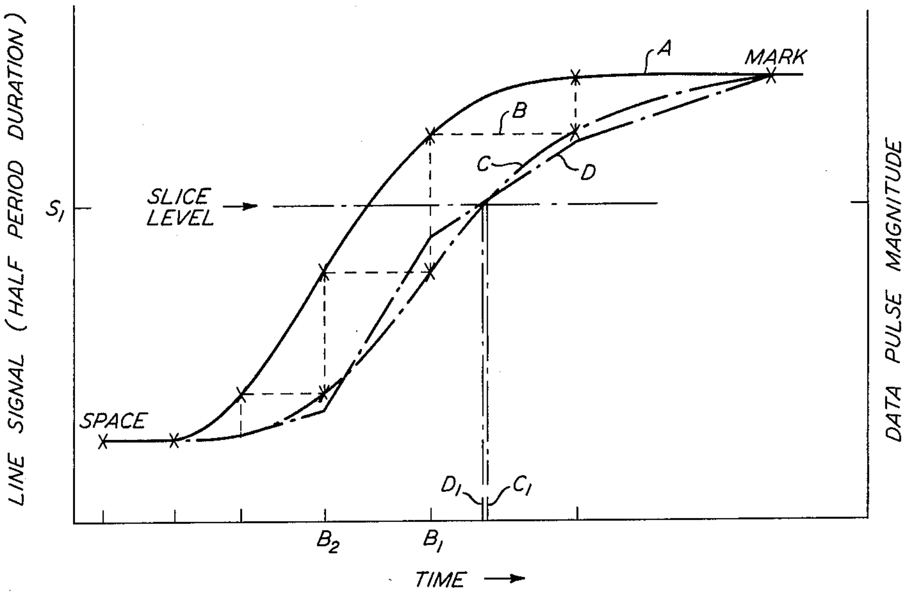
FIG. 2 is a diagram of a space-to-mark data transition illustrating the manner in which it might be detected by different types of demodulating structures.

A broard-brush picture of the operating principle of the digital demodulator may be presented in connection with the diagram of FIG. 2 wherein line signal half-period duration, and original data pulse magnitude are both plotted against the same time scale. In that picture, the solid curve A represents a typical space-to-mark transition in the amplitude of a pulse data wave. This curve has been magnified to illustrate the well-known fact that such a transition is not instantaneous but requires a finite time interval which may, in fact, have a duration approaching the length of one data bit.

The dotted step diagram B in FIG. 2 illustrates the manner in which a simple frequency counter might be controlled by C pulses for demodulating frequency-shift data in a digital manner. It is assumed that the C pulses may occur at times indicated by the $x$ marks on curve A. The time spacing between these $x$ marks, and between their corresponding ticks on the horizontal time axis, increases from left to right along curve A. This represents the increasing duration of C-pulse intervals as the data signal changes from a high frequency space signal to a low frequency mark signal. In the intervals between C pulses, the frequency counter operates; and at each C pulse the counter output is sampled to determine the nature of the data signal. Thus, dotted diagram B shows that the sampled counter output indicates a constant line signal half-period duration between C pulses, and at each C pulse the counter output jumps up in step fashion to indicate the new half-period duration.

If a slice level S1 is assumed to be the data pulse magnitude which defines the end of a space and the beginning of a mark, then at time B1 our hypothetical frequency counter indicates that a space-to-mark transition has taken place. As previously noted, however, there is no synchronous relationship between the original data and the carrier frequency on which it is modulated. Thus, a considerable amount of drift can and does occur between carrier oscillation zero-voltage axis-crossings and data bit transitions. Accordingly, although the time B1 appears at a definite point in FIG. 2, it must be understood that due to the relative drift between carrier oscillations and data transitions, the assumed frequency counter cannot say with certainty at exactly what time the actual data transition took place prior to time B1. It is clear only that the transition took place after time B2 and before time B1. This range of variation, which occurs at each bit transition, creates a great deal of jitter in the resulting data wave and makes the wave nearly useless for timing recovery purposes.

The digital demodulator of FIG. 1 avoids the problem described in large measure by performing a digital integration. At the end of each C-pulse interval, the duration of the interval is compared with the immediate past history of interval sizes, and a counter is directed to produce an output signal more closely approximating the signal represented by the recently measured C-pulse interval. This operation is illustrated by the dash-dot curve D in FIG. 2, and it can be seen that curve D represents a very close approximation of the ideal demodulated data transition illustrated by the broken line curve C.

Referring once more to slice level $S_1$, it is seen that curve C intersects this level at time C1, and that curve D intersects the level at a time D1, which is virtually coincident with C1. Thus, the range of uncertainty in fixing the exact time of the data transition is reduced to a size which is usually negligible in comparison with the actual time required for the transition. This reduction in uncertainty in determining transition time results in substantially reduced jitter of the demodulator output, as may be understood upon further consideration of FIG. 1.

In FIG. 1, C pulses from pulse generator 100 are applied to reset a program binary counter 201 to its zero count condition and to enable the drive input to the aforementioned counter 201 if such input had been inhibited during the previous C-pulse interval. C pulses are also applied to inhibit further counting of a rate-computing, reversible, binary counter 202. Counter 201 then counts high frequency pulses $f_1$ from a local oscillator. The frequency $f_1$ may be approximately forty times greater than any of the data line frequencies, and the other clock frequencies $f_2$ and $f_3$ may be about twenty and ten times greater than any data line frequency. Counter 201 includes logic circuits coupled to the various stages thereof for producing output signals in response to the attainment of preselected counting levels, as is well known in the art. These signals occur at predetermined times after the beginning of each C-pulse interval.

A first program signal is applied to a lead 203 for enabling a group of setting gates 204, which couple counter output signals from a reversible rate counter 202 to a rate store 205. A logic network 206 is provided for controlling the counting direction of rate counter 202 in accordance with a predetermined plan. At the beginning of each C-pulse interval, counter 202 is set to a certain count level. At a predetermined later time, fixed by program counter 201, counter 202 counts oscillations $f_1$ from clock source 207 during the rest of the C-pulse interval. The counting is carried on initially in the reverse direction, and when the counter has reached zero it is automatically reversed by control logic 206 and begins counting in the forward direction thereafter.

Setting gates 204 are further operated in response to the program signals on lead 203 for also transferring to a direction store 208 a signal from logic 206 indicating the direction in which counter 202 was operating at the end of the last measured C-pulse interval. The output of direction store 208 is applied to the direction control input connection 209 of a second reversible binary counter 210 to cause counter 210 to operate in the same direction that counter 202 was just operating.

An output from rate store 205 is applied to frequency selecting logic 211 which receives the output frequencies $f_1$–$f_3$ from source 207. Logic 211 is caused to couple to counter 210 either a large, small, or intermediate drive frequency depending upon the count level attained by counter 202 prior to the end of the measured interval. Counter 210 immediately begins to operate under its newly directed conditions.

At a later time in each interval, a signal from program counter 201 is applied by a program lead 212 to another group of setting gates 213, which transfer the count in counter 210 into rate counter 202 for thereby establishing the initial level from which counter 202 must operate during the succeeding C-pulse interval. At a still later time, a signal on lead 214 from program counter 201 is applied to cause counter 202 to begin its operation. In each subsequent C-pulse interval, rate counter 202 automatically compares the duration of the C-pulse interval with the past history of interval durations as represented by the count level previously transferred from the data counter 210. As a result of this comparison, the subsequent rate and direction of operation for data counter 210 are adjusted to bring its indication into closer conformity with the size of the recently measured C-pulse interval.

An output from counter 210 is applied by a connection 215 to the data and timing synchronizer 400 to be used in synchronizing a clock signal for providing demodulator output timing. Another output from counter 210 is applied by a connection 216 to the sampler 500, which also receives timing signals from synchronizer 400. Sampler 500 gates the data indications from counter 210 out of the demodulator as start and data pulses.

Figure 3A:
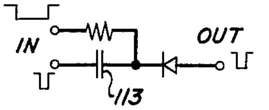
FIGS. 3A–3E and 4A–4E show schematic diagrams of conventional logic elements and their corresponding schematic representations used in the drawing.

In considering the detailed operation of the demodulator of FIG. 1, it is convenient to employ condensed schematic representations of certain well-known logic blocks. These blocks and their corresponding schematic representations are illustrated in FIGS. 3 and 4, respectively. FIGS. 3A and 4A show a resistor, capacitor, diode AND gate which receives negative-going signals on its input terminals and produces a similar signal at its output. For convenience of discussion two input signals at ground voltage will enable, or open, the gate to produce a ground output. The capacitor in this gate performs a differentiating function so that only the negative-going transition of a signal applied to the capacitor produces a gate output. Thus, the output from this type of gate always consists of a narrow impulse coincident with the negative-going edge of the signal applied to the capacitor. Also, the effect of an enabling or disabling signal is delayed by a time interval controlled by the values of the resistor and capacitor. However, if either gate input is positive the gate remains closed unless the positive signal applied to the gate resistor is smaller in amplitude than the negative-going signal applied to the gate capacitor. The dot adjacent to one input lead in the schematic representation of FIG. 4A indicates the lead which connects to the capacitor 113 in the gate of FIG. 3A.

Figure 3B:
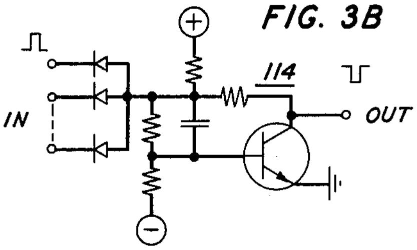
Figure 4A:
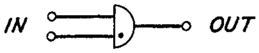
Figure 4B:
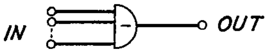

FIGS. 3B and 4B show a transistor-diode AND gate which produces a ground output signal if all of the input signals applied thereto are positive. If one of the input signals is at ground, the output from the gate is positive. This gate comprises one or more conventional AND-diode input connections which are all coupled to the control input terminal of a common emitter transistor amplifier 114. The output of amplifier 114 is derived at the collector electrode thereof. In FIG. 4B the minus sign adjacent to the output lead indicates the phase inversion.

Figure 3C:
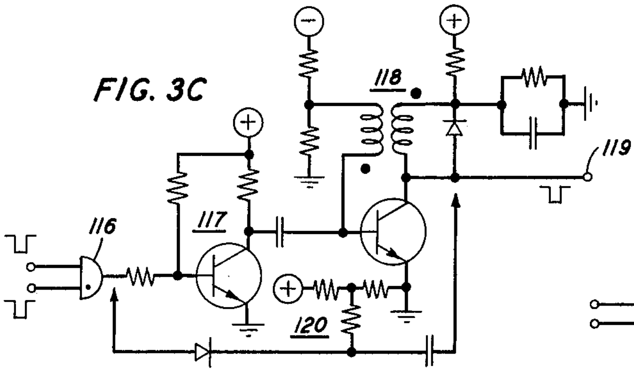
Figure 4C:
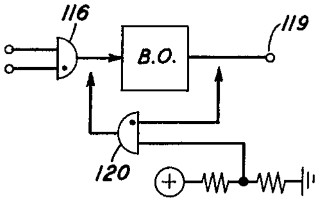

FIGS. 3C and 4C show a transistor blocking oscillator. In this oscillator input signals are applied through AND gate 116 to the control electrode of a common emitter transistor amplifier 117. The output at the collector electrode of the transistor in amplifier 117 is capacitively coupled to the input of a transistor blocking oscillator circuit 118 to drive the latter circuit into its unstable conduction condition. Negative-going, ground pulses appear at the output terminal 119 in response to the coincidence of two ground input signals at gate 116.

A positive feedback circuit may be added in the blocking oscillator by means of an additional AND gate 120 for coupling the output of oscillator 118 back to the input of amplifier 117. This feedback connection may be used if desired in order to overcome the effect of differentiation of input pulses by the aforementioned capacitive coupling between amplifier 117 and oscillator 118. If an input pulse is unusually short the differentiated negative-going impulse which results from the trailing edge of the pulse tends to stop the action of oscillator 118 prematurely when a feedback gate 120 is not used.

Figure 3D:
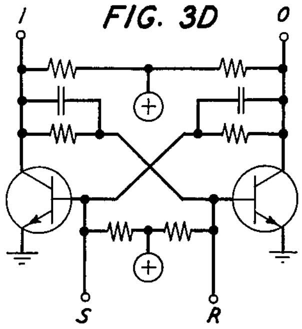
Figure 4D:
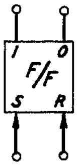

FIGS. 3D and 4D show a transistor bistable multivibrator, or flip-flop, circuit. The set and reset input terminals are designated by letters "S" and "R," respectively. A ground applied to set terminal S produces a positive signal at output terminal ONE and a ground signal at output terminal ZERO. In a similar manner, a ground applied at reset input terminal R produces a positive output at terminal ZERO and a ground at terminal ONE. The same terminal designations are carried through to the simplified schematic representation in FIG. 4D.

Figure 4E:
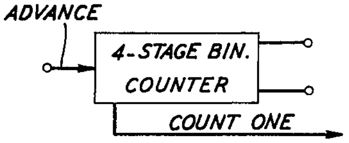
Figure 3E:
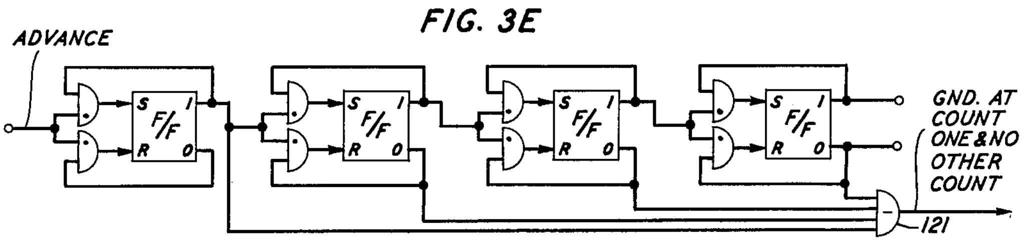

FIGS. 3E and 4E show a binary counter which in the illustration happens to be a four-stage counter. This counter includes bistable, or flip-flop, circuits such as those shown in FIGS. 3D and 4D, with complementing input connections. Such connections for each flip-flop comprise an AND gate with its output connected to the set input of the flip-flop and another AND gate connected to the reset input. The ONE and ZERO outputs of each stage are coupled back to enable its respective set and reset input AND gates. Input pulses which are to be counted are applied to the pulse input connections of both the set and the reset gates of the first flip-flop. A connection from the ONE output of each stage to the complementing pulse input of the next stage is provided in the usual manner. In addition, logic circuits may be associated with the counter for deriving output signals at certain count levels. For this purpose the illustrative example in FIG. 3E shows a transistor-diode AND gate 121 arranged with enabling inputs from the ONE output of the first counter stage and the ZERO outputs of the last three counter stages so that the output of gate 121 is ground at a count of unity and is positive for all other counts. The schematic representation of this counter with the corresponding output terminals and derived count signal leads is shown in FIG. 4E.

Figure 5:
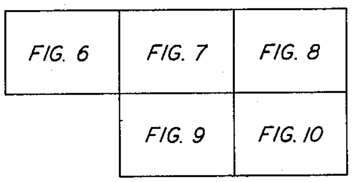
FIG. 5 is a diagram illustrating the manner in which the remaining FIGS. 6 through 10 may be combined to provide a composite, simplified, schematic diagram of the demodulator of FIG. 1.

FIGS. 6 through 10 may be assembled in the manner illustrated in FIG. 5 to form a composite schematic diagram of the demodulator. The subsequent description of the demodulator will be carried out in connection with this composite diagram.

*C-pulse generation*

Figure 6:
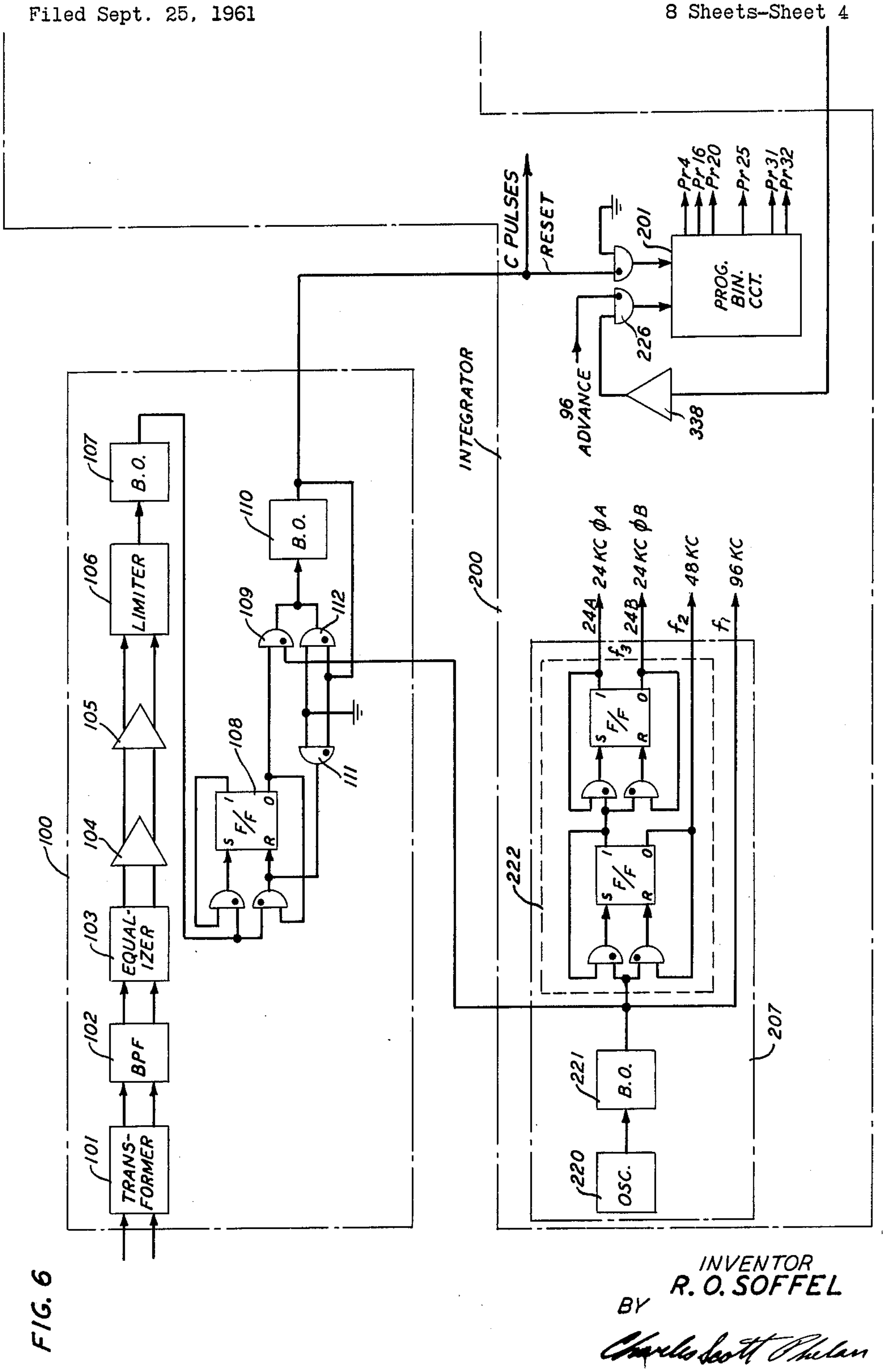

In FIG. 6, frequency-shift data signals are applied to a transformer 101, which couples them to the input of a bandpass filter 102 for eliminating spurious frequencies that lie outside the band of the desired carrier and sideband frequencies. An equalizer 103 performs the usual phase and amplitude equalization functions which are desirable after a signal has been received from an extensive transmission circuit. The output of equalizer 103 is coupled by the amplifiers 104 and 105 to the input of a suitable limiter circuit 106. Limiter 106 performs the functions of limiting, differentiating, and full-wave rectifying in a well-known manner for producing output voltage impulses at the zero-voltage axis-crossings of each cycle of the line signal. These impulses are amplified and coupled to a blocking ocillator 107 which increases the amplitude of the impulses to obtain steep leading and trailing edges, and the output of this oscillator is coupled to the complementing input of a flip-flop circuit 108. The ground ZERO output of the flip-flop 108 partially enables AND gate 109.

A local high-frequency oscillator 220, which is part of source 207, provides oscillations $f$ through a buffer blocking oscillator 221 to open gate 109 and trigger a blocking oscillator 110. The output of oscillator 110 is coupled through a first continuously-enabled AND gate 111 to reset flip-flop 108, and the output is also applied through a second continuously-enabled AND gate 112 to stabalize oscillator output as described in connection with FIG. 3C. Each subsequent C pulse from oscillator 107 sets flip-flop 108 and permits a pulse from the output of oscillator 220 to trigger blocking oscillator 110 as described. The continuously occurring C pulses in the output of oscillator 110 are synchronized with the clock oscillations $f_1$ and are applied by a lead designated "C-pulses" to different parts of the demodulator on leads bearing the same designation. Actual connecting leads are not shown in the drawings for this purpose, or for other programming or timing functions since they would only serve to inject an unnecessary complication where the required functions can be appropriately indicated by reference characters of the type described for the C-pulse leads.

A two-stage binary counter 222 receives the output of blocking oscillator 221 and divides down the frequency in the usual manner which is typical of binary counters. If it is assumed that oscillator 220 has an output of 96 kilocycles per second, this frequency is made available from the output of blocking oscillator 221 by a lead designated "96 kc." A 48 kilocycles per second clock signal, $f_2$, appears at an output lead originating in the first stage of binary counter 222. In a like manner, 24 kilocycles per second output signals, $f_3$, of opposite phase with respect to one another appear at the ONE and ZERO outputs of the second stage of binary counter 222 on leads designated "24A" and "24B." As previously mentioned, these lead designations are carried forward into the rest of the schematic diagram to indicate routing of the various timing signals. Oscillators 220 and 221, and counter 222 comprise the multifrequency oscillator 207 of FIG. 1.

Figure 7:
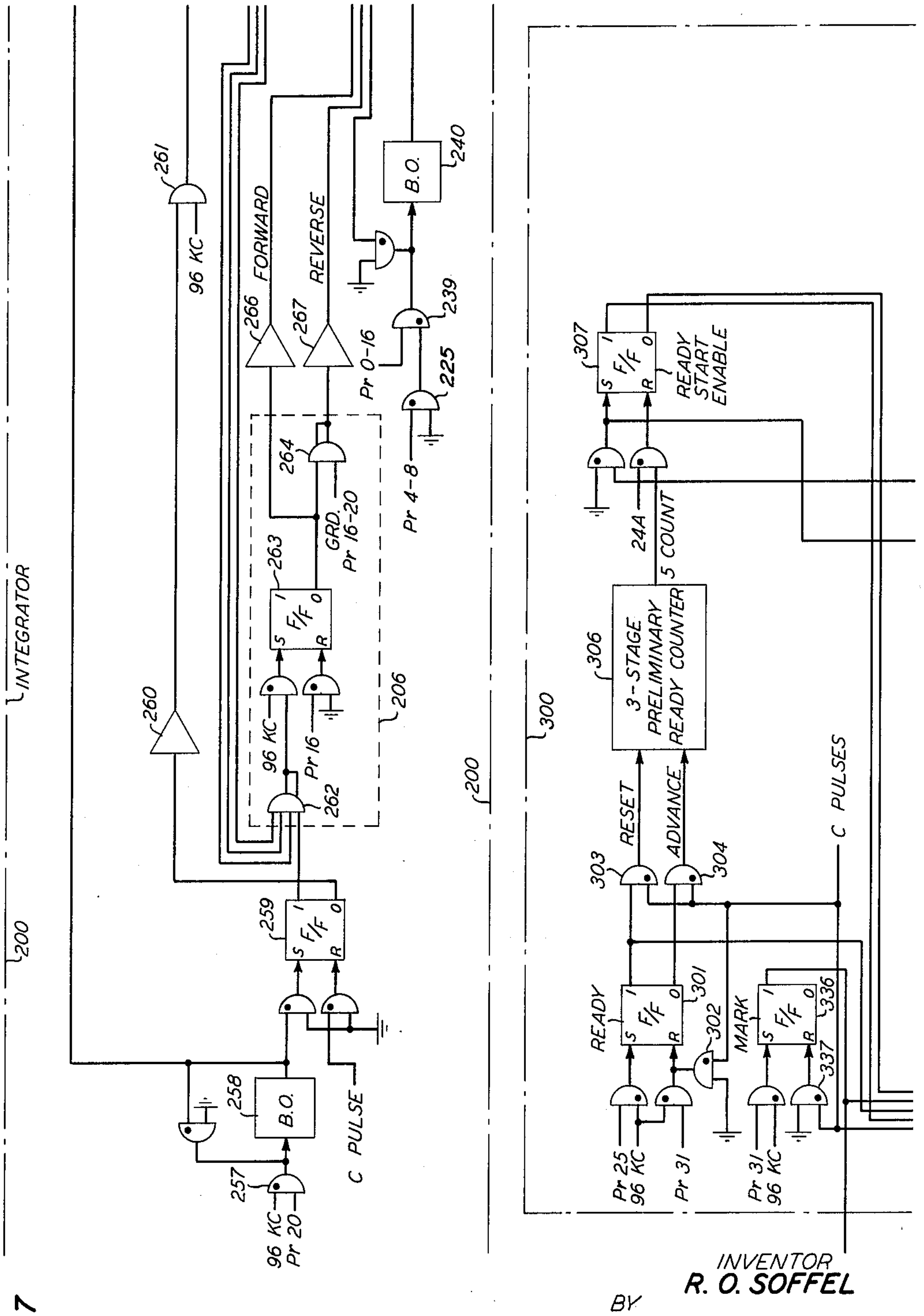
Figure 8:
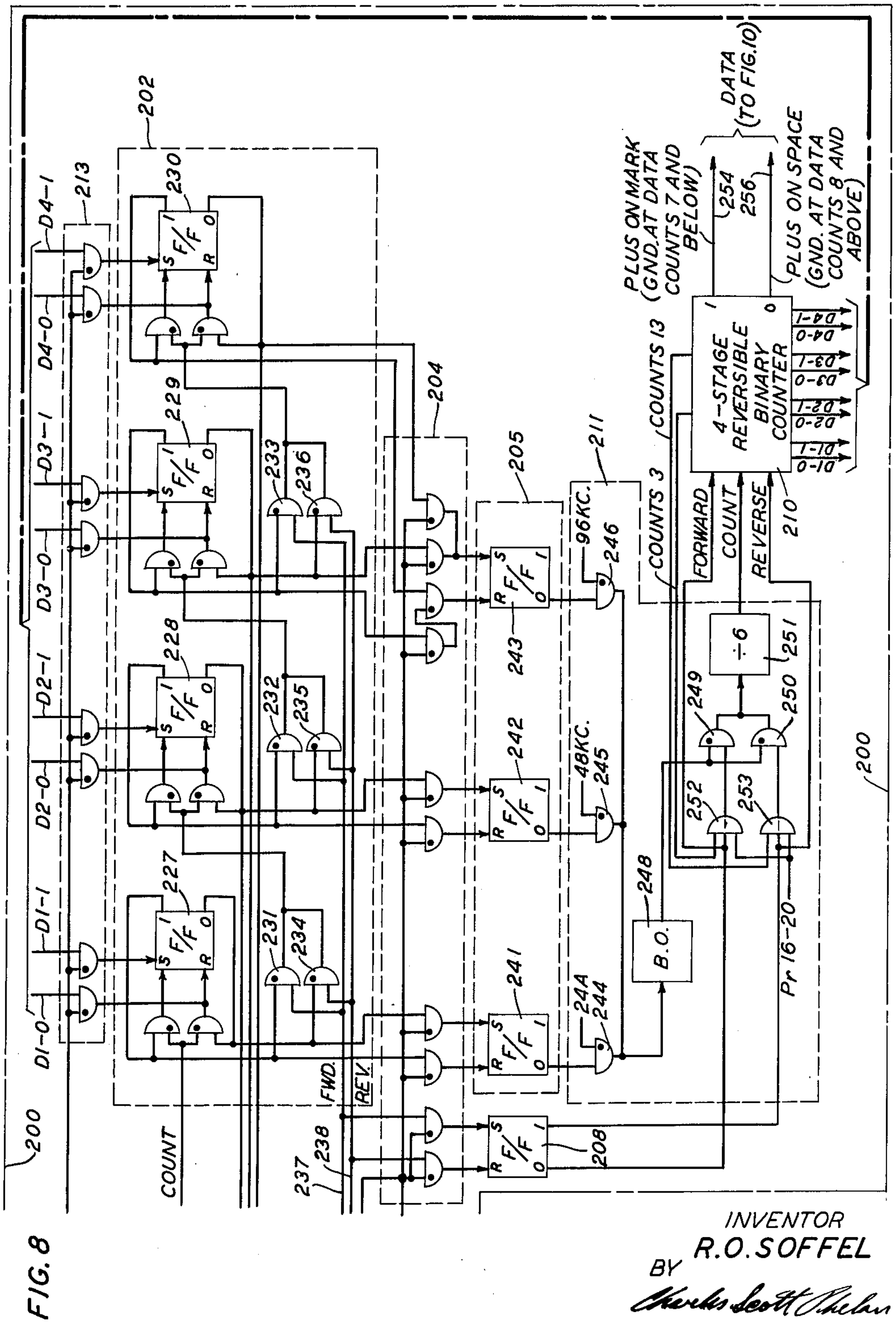

The most convenient way to begin a description of the integrator 200, the bulk of which is shown in FIGS. 7 and 8, is to start with a description of the rate-computing counter 202 and its operation. When counting, rate counter 202 is driven by 96 kc. clock pulses applied to a flip-flop 227 in a manner which will be described. The initial operating level of the counter varies in a manner which will also be described. In the illustrated embodiment, this counter is shown in FIG. 8 and includes four flip-flop circuits 227 through 230. At any one time, one of the outputs of each of the first three stages is coupled to a complementing input of the following stage. A group of gates 231 through 236 is employed for selecting the particular output of each stage which will be used in order that the counter may be selectively operated as a forward counter or a reverse counter. Thus, in the case of flip-flop 227, its ZERO output is coupled through an AND gate 234 to the complementing input of flip-flop 228, and its ONE output is coupled through an AND gate 231 to the same input of flip-flop 228. An enabling signal applied to lead 237 enables all of the gates 231 through 233 which are all similarly connected for interconnecting the counter stages for forward counting. That is, a ground at the ONE output of a particular stage is coupled through the corresponding AND gate to the complementing input of the next stage. In like manner, an enabling signal applied to lead 238 enables gates 234 through 236 for coupling the ZERO output of each of the flip-flops 227 through 229 to the complementing input of the following stage for connecting the counter to operate in reverse.

Program counter 201 counts 96 kc. pulses received through AND gate 226 from the local clock during each C-pulse interval. Certain program counts are indicated by counter output leads bearing various designation of the type "Pr——." The size of the count or interval between the preceding C pulse and the output signal is indicated by the numeral which appears in the blank in the lead designation. Each C pulse resets counter 201; and the size of a given count will depend upon the time interval spacing between C pulses. Thus, for example, a count in the illustrative embodiment which is less than 25 indicates a space data bit. A count of 25 or more, but less than 31, indicates a ready bit; and a count which is 31 or more indicates a mark bit. Counter 201 thus operates as a frequency counter. The operation of the integrating portion of the present demodulator will be described in connection with these program counts since this will give a clear picture of the sequence and nature of integrator operations.

At count 4, two AND gates 225 and 239 in FIG. 7 are opened by signals from program counter 201. Gate 239 was initially enabled at the reset time of counter 201. Gate 225 is permanently enabled and is initially opened by an output signal from counter 201 at the count 4, Pr04. The output of gate 225 opens gate 239 at program time Pr04 and the ground output signal from gate 239 at that time triggers a blocking oscillator 240.

Setting gates 204 are opened by the output of oscillator 240 for sampling the signal conditions on leads 237 and 238 which control the drive direction of rate counter 202 and for sampling the output conditions of rate counter flip-flops 227–230. If counter 202 was being driven in the forward direction prior to program signal Pr04, a ground is present on lead 237, and direction store flip-flop 208 is set at program time Pr04. Similarly, if rate counter 202 had been driven in the reverse direction just prior to time Pr04, flip-flop 208 is reset at program time Pr04 by the ground on lead 238. The ONE and ZERO output connections of direction store flip-flop 208 are coupled to the forward and reverse input leads controlling counter 210 which is of the same type as the previously described counter 202.

Setting gates 204 also sample the output conditions of the stages of rate counter 202 as previously mentioned and cause rate store flip-flop circuits 241, 242, and 243 to be set or reset accordingly. The ZERO outputs of these flip-flops are applied to enabling inputs of gates 244, 245, and 246 in selecting circuits 211. A rate count of unity causes flip-flop 241 to be set and enable gate 214 to be set and enable gate 244 to couple 24 kc. clock pulses for driving a blocking oscillator 248. In a similar manner, a rate count of two causes store flip-flop 242 to be set while flip-flop 241 is reset. Now gate 245 is enabled while 244 is disabled, and 48 kc. clock pulses are coupled to blocking oscillator 248.

At the rate count of three both the store flip-flops 241 and 242 are set, and gates 244 and 245 are both enabled to couple clock pulses 24 kc. and 48 kc. to blocking oscillator 248. Oscillator 248 is not confused however, since the phases of these frequencies, which are synchronized and harmonically related, are so chosen that none of the 24A and 48 kc. pulses are coincident. Accordingly, oscillator 248 runs at the sum frequency of 72 kilocycles per second. At rate counts of 4 and above, at least one of the rate counter flip-flops 229 or 230 is always in the set condition and causes store flip-flop 243 to be set for opening selection gate 246. This gate couples 96 kc. clock pulses to drive blocking oscillator 248. The 96 kc. pulses are coincident with all 24 kc. and 48 kc. pulses. Therefore, when flip-flop 243 is set, the counting rate is always 96 kilocycles per second regardless of the conditions of flip-flops 241 and 242.

The output of oscillator 248 is applied to open one of the AND gates 249 or 250 which was previously enabled by a ground output from the one of two transistor-diode gates 252 or 253 which had been previously enabled by a positive output from one of the output connections of direction store flip-flop 208.

At the program time P*r*16, and thereafter until program time 20, gates 252 and 253 receive a ground disabling signal from program counter 201. At all other times this signal from counter 201 is positive and tends to enable the gates 252 and 253. These gates also receive input signals from a count three output and a count 13 output, respectively, of binary data counter 210. At count 3 in data counter 210 a ground disabling signal is applied to gate 252 to inhibit its operation. Since this gate also receives positive ZERO outputs from store flip-flop 208 at times when rate counter 202 had been counting in the reverse direction, the count 3 output of counter 210 inhibits further reverse counting. In a like manner, the count 13 output of data counter 210 inhibits gate 253 to prevent any further forward counting of the counter 210.

Accordingly, if the demodulator program is not between program times 16 and 20, and if the count in data counter 210 is not at count 3 or count 13, one of the gates 252 or 253 is enabled by an output of rate store 208 and causes one of the gates 249 or 250 to be enabled. The enabled one of the latter two gates passes clock pulses of the selected frequency from blocking oscillator 248 to a conventional frequency divider 251 which divides down the clock frequency by a factor of six. The output, of divider 251 is applied as a drive signal for operating data counter 210.

Data counter 210 is a four-stage reversible binary counter such as counter 202 and has the ONE and ZERO outputs of its fourth stage connected to output leads 254 and 256. Thus, ONE lead 254 is positive for data counts of eight and above to represent data marks or ONEs, and ground at other times. Lead 256 is positive for counts in data counter 210 of zero through seven to represent data spaces or ZEROs and ground at other counts.

All of the safety margin in possible counts above eight and below seven is not required for safe discrimination between ONEs and ZEROs. Accordingly, the aforementioned outputs at count 3 and count 13 are provided to inhibit counter operation in a direction which tends to depart any further from the seven-eight count level. As previously described, when counter 210 counts in reverse and reaches count 3, its output inhibits gate 252 to block the supply of further clock pulses and prevent further reverse operation of counter 210. Similarly, if counter 210 resides at count 13 it causes gate 253 to be inhibited for blocking the application of additional drive pulses to the counter as long as forward counting is indicated.

Between program counts of P*r* 16 and P*r* 20, gates 252 and 253 are inhibited by outputs from program counter 201. This action permits setting gates 213 to settle down to a quiescent condition as enabled by the integrating data counter 210; for at program count P*r* 20 setting gates 213, are then opened by a signal to be described. These gates have their enabling input connections coupled to the ONE and ZERO output leads of the four stages of data counter 210. The outputs of setting gates 213 are applied to the set and reset input connections of the flip-flop circuits in rate counter 202. Thus, in data counter 210 the ZERO output of the first stage is connected by a lead designated D1–0 to the enabling input of one of the setting gates 213 which has its output coupled to the reset input of rate counter flip-flop 227. In like manner, the ONE output of the same data counter stage is connected by a lead D1–1 to the enabling input of a setting gate in the set input circuit of flip-flop 227. Other data counter ONE and ZERO outputs from the data counter stages are similarly connected to set and reset inputs, respectively, of corresponding rate counter stages.

At program time P*r* 20, a 96 kc. clock pulse is coupled through AND gate 257 in FIG. 7 to drive a blocking oscillator 258. The resulting output pulse from oscillator 258 is applied to open those ones of setting gates 213 which have at that time been enabled by ground output signals from one of the stages of counter 210. In this fashion the count in data counter 210 is transferred at program count P*r* 20 into the corresponding stages of rate counter 202.

Also at program time P*r* 20, the aforementioned output pulse from blocking oscillator 258 opens the set gate of a flip-flop circuit 259 which had been previously reset by the C pulse that initiated the program cycle now in progress. The resulting ground ZERO output from flip-flop 259 is amplified without phase inversion by an amplifier 260 and applied to enable AND gate 261. Subsequent 96 kc. clock pulses are then applied through gate 261 to the complementing input of flip-flop 227 in rate counter 202. At this time rate counter 202 begins to count from the counting level which has just been transferred into its stages from data counter 210.

A positive ONE output from flip-flop 259 enables a transistor-diode gate 262 in the direction control logic circuit 206. This gate receives additional input signals by means of connections to the ZERO outputs of rate counter flip-flop circuits 228–230. Thus, if rate counter 202 is in its unity count condition or is completely reset to the zero count condition, gate 262 is fully enabled. The resulting ground output from gate 262 opens the set gate of a flip-flop circuit 263, which had been previously reset at program time P*r* 16. Flip-flop 263 is now set by the next 96 kc. clock pulse and produces a ground ZERO output which disables transistor-diode gate 264 and which is also coupled without phase inversion by an amplifier 266 to the forward control lead 237 of rate counter 202. Counter 202 is thus caused to count the 96 kc. clock pulses by operating in a forward counting direction.

At program time 20 rate counter 202 has been set in a counting condition which is higher than unity since the count in data counter 210 must always be between 3 and 13, inclusive. One of the stages 228–230 in rate counter 202 is set and gate 262 is disabled thereby preventing the setting of flip-flop 263. This flip-flop, which was reset at program time 16, then applies a positive ZERO output to enable gate 264 and disable the forward control gates 231–233 via the non-inverting amplifier 266. An inhibiting voltage which had been applied to gate 264 between program times 16 and 20 is now removed, and the resulting ground output from the gate is coupled without phase inversion through another amplifier 267 to the reverse control lead 238 of rate counter 202.

Counter 202 continues its operation until the appearance of a C pulse at the end of the measured C-pulse interval opens the reset gate of flip-flop 259 thereby producing a positive ZERO output which disables AND gate 261 for preventing the coupling of further 96 kc. drive pulses to the counter.

Since counter 202 had begun its operations in the reverse counting direction, it counts down to the unity count level and then enables transistor-diode gate 262 in the direction control logic 206, as previously described. Gate 264 is thereby disabled as counter 202 reaches the zero count level, and a ground appears on lead 237. This action causes rate counter 202 to switch from the reverse counting direction to the forward counting direction.

Following the end of counting by rate counter 202 at the occurrence of a C pulse, a new C-pulse interval begins. Program counter 201 is recycled; and at program time *Pr* 04 of the new interval, blocking oscillator 240 is again triggered to actuate setting gates 204 for sampling the count condition and counting direction of rate counter 202 as previously described. The further integrator operations continue over and over again for each half-cycle period of the received frequency shift data signals.

Assuming a prolonged space condition when line frequency is at 2,075 cycles per second, data counter 210 has counted down to its limiting count level of three and thereafter its further reverse counting is inhibited. Each time a program signal *Pr* 20 occurs, setting gates 213 set the rate counter 202 flip-flops at the binary designation of count 3. Counter 202 then begins counting in the reverse direction and counts down toward its unity count condition. Since the program count of *Pr* 25 is the dividing line between space and ready indications, rate counter 202 would, in the steady space condition, count in reverse from three at *Pr* 20 to about zero at *Pr* 23 before its operation is stopped by a C pulse. At the program sampling time *Pr* 04, setting gates 204 transfer to stores 205 and 208 signals indicating that rate counter 202 was counting in the reverse direction and attained the zero level. At that level all flip-flops 227–230 are reset so none of the store flip-flops 241–243 is set. Accordingly, no drive signals are applied to data counter 210, and it stays at its three count level for a space indication.

When a change begins from space to mark, the transitional line frequency half-periods may look like 1,700 cycles per second at about the half way point frequency-wise. This is the ready frequency, and the program counter 201 advances to at least *Pr* 25 before a C pulse stops it. In the meantime rate counter 202 counts in reverse from the three count level at program time *Pr* 20 to the zero level and then forward to about two at program time *pr* 25. In the following second C-pulse interval the program time signal *Pr* 04 causes a sampling operation, and the stores tell counter 210 to count forward at a rate which is a function of the rate of two, i.e., 48 kilocycles per second divided down by six, or 8 kilocycles per second. Counter 210 operates from *Pr* 04 to *Pr* 16 at that rate and thus advances by a single count to four. The program advances twelve counts at 96 kilocycles per second in the same interval, but counter 210 is operating at only one-twelfth of that rate and advances only one count.

At program time *Pr* 20 of the new C-pulse interval, the four count is transferred to rate counter 202, and it starts counting, again in reverse, from this new count level. This time program counter 201 may reach a count level of *Pr* 28, i.e., not yet a mark, before the next C pulse stops it. Rate counter 202 then operates over the program interval *Pr* 20–28 in the second interval and counts down to zero and then up to four. Now at sampling time *Pr* 04 of a third interval counter 202 directs data counter 210 to go forward at top speed, namely one-sixth of 96 kilocycles per second.

Counter 210 was at count four at time *Pr* 20 in the second interval when rate counter 202 started. Data counter 210 started again at that time and continued through *Pr* 28 to *Pr* 04 of the third interval. Thus counter 210 had operated at the 8 kilocycles per second rate for twelve more program time slots and reached the count of five by the time it received its new instruction to count at 16 kilocycles per second. Now counter 210 continues counting forward at 16 kilocycles per second from the five count level at *Pr* 04 in the third interval. This time from *Pr* 04 to *Pr* 16 it advances two counts to seven, and at *Pr* 20 the count of seven is set into rate counter 202. Operation continues in this fashion until at some time between C pulses counter 210 gets to eight and its associated logic output signals change from space to mark. In each interval it continues advancing, if the mark frequency of 1,325 cycles per second is still coming in, until it reaches thirteen; and then it inhibits its further advance as previously described. A similar pattern of operation is followed for a mark-to-space transition, but in that case data counter 210 counts in reverse.

*Ready-start detector circuit*

The ready-start detector 300 receives mark-interval and ready-interval C pulses as well as receiving indications from program counter 201 to suggest whether a particular C pulse is associated with a mark frequency or a ready frequency. In addition, the ready-start detector receives other program signals from counter 201 to coordinate its actions with other functions of the demodulator. The output from the ready-start detector is a ground pulse which is applied to the timing and phase control circuits advising them that a ready-mark portion of the ready-start signal has been detected and that the timing and phase control circuits should start looking for the space bit of the ready-start code.

The object of the ready-start detector is to distinguish the ready-start code combination from data signals and from noise which may appear on the incoming transmission line. This combination includes four bit-intervals of ready frequency at about 1,700 cycles per second, four bit-intervals of mark frequency at about 1,325 cycles per second, one bit-interval of space frequency at about 2,075 cycles per second, and one more bit-interval of mark frequency. During these successive intervals of ready, mark, space, and mark bits approximately 18, 14, 5½, and 3½ C-pulse intervals, respectively, will occur. The detection of this code combination is accomplished by counting the number of line frequency half cycles which occur and by carrying on this counting in a particular controlled manner. If the numbers of half cycles, i.e., C-pulse intervals, which are counted are reasonably close to those indicated above during the four ready bit-intervals and the four mark bit-intervals, it is assumed that a ready-start code is coming in and a signal is given to the timing and phase control circuits to be ready for the start space bit within the next few data bits.

The first function which must be performed is the detection of the four bit-intervals of ready line signal. For this purpose a ready flip-flop circuit 301 in FIG. 7 is provided. Flip-flop 301 receives a C pulse at the end of each C-pulse interval, and that pulse opens a permanently enabled reset gate 302 for resetting the flip-flop. If thereafter the count in program counter 201 attains a level of *Pr* 25 indicating that a ready signal may be coming, flip-flop 301 is set by the next 96 kc. clock pulse following the program signal *Pr* 25. If the program counter attains the level *Pr* 31, indicating a mark, its output signal *Pr* 31 enables the reset gate of flip-flop 301, and the flip-flop is thereafter reset by the next succeeding 96 kc. clock pulse.

Ground ONE and ZERO outputs of flip-flop 301 enable two AND gates 303 and 304, respectively. If flip-flop 301 is reset at *Pr* 31, gate 303 is enabled by the ground ONE output of the flip-flop and couples the next succeeding C pulse to the reset input of a three-stage binary counter 306. This means that the C-pulse interval just measured was part of a mark burst of line frequency oscillations. However, if flip-flop 301 remains in its set condition during the balance of a C-pulse interval after program signal *Pr* 25, a ready interval is indicated; and its ground ZERO output enables gate 304 to pass the next C pulse to the advance input of binary counter 306. A continuation of the ready line frequency through an additional C-pulse interval causes program signal *Pr* 25 to set flip-flop 301 once more so that the succeeding C pulse again advances counter 306. This operation continues while each C-pulse interval is examined by program counter 201 for indicating to flip-flop 301 whether or not a ready interval is being examined and whether or not a mark interval is being examined.

Each ready interval causes counter 306 to be advanced by one count. When the counter attains a count level of five, its ground output enables the reset gate of a flip-flop circuit 307 and that flip-flop is thereafter reset by the next succeeding 24A clock pulse. Flip-flop 307 controls most of the rest of the ready-start detector 300. Counter 306 is a preliminary counter provided to tell the balance of the ready-start circuits, through flip-flop 307, when it looks as though a ready-mark combination may be coming in. This type of preliminary counter prevents the operation of the ready-start detector from being initiated by short-term ready frequencies such as those which may occur in a data transition between mark and space and which may last for perhaps two to three C-pulse intervals. Such a transient condition does not cause counter 306 to attain its 5 count level and is therefore rejected by the counter as the beginning of a ready-mark combination.

Flip-flop 307, which is sometimes called the ready-start enable flip-flop, now produces in its reset condition a positive ZERO output signal. This signal is applied to input connections of two transistor-diode gates 308 and 309 in FIG. 9 which are called the mark and ready gates, respectively. These gates control the application of C pulses to a four-stage ready and mark binary counter 310. The positive ZERO output of ready-start enable flip-flop circuit 307 is also employed to prevent the resetting of three memory flip-flop circuits 311, 312, and 313 which will be further described.

Ready gate 309 receives two additional input signals besides the positive ZERO output of flip-flop 307. It receives the positive ONE output of ready bistable 301 each time a ready C-pulse interval appears. The third input to ready gate 309 is a positive ZERO output from the normally reset memory flip-flop 311. Thus, if flip-flop 301 is in the set condition, and flip-flop 307 in the reset condition when a C pulse occurs, their outputs have enabled ready gate 309. The ground output from gate 309 enables gate 316 in the advance input circuit of binary counter 310. Because of the inherent delay in the enabling input of gate 316, counter 310 is advanced even though the C pulse resets ready bistable 301 which, in turn, disables gate 309. Gate 316 is thereafter opened each time a C pulse occurs when bistable 301 is in the set condition and causes counter 310 to advance by one count.

When counter 310 has counted six ready C pulses, i.e., for a total of eleven since five were previously counted by counter 306, the six count ground output signal of counter 310 enables the set gate of memory flip-flop 311. The next C pulse sets flip-flop 311 to remember the fact that counter 310 has counted six ready C pulses. The eleven received C pulses represented by this six count constitute more than half of the eighteen C pulses that may be expected to occur in a normal four-bit ready combination. It is, therefore, assumed at this time that the four ready bits will occur or have just occurred. Ground ZERO output of flip-flop 311 now is coupled back to disable ready gate 309 and is also coupled to the enabling input of AND gate 317 in the set input of memory flip-flop 313. No more ready pulses can now be counted.

During the time interval when counter 310 was counting ready C pulses, another four-stage binary counter, the C-pulse counter 318, was receiving C pulses to open AND gate 319 in its advance input circuit. Gate 319 had been previously enabled by the ground ONE output of the ready-start enable flip-flop 307. Counter 318 is provided to measure the maximum time interval during which ready-start detector circuit 300 may operate to detect a ready-mark combination. If during that interval after flip-flop 307 has been reset, the proper combination has not been detected, counter 318 causes the ready-start detector 300 to be reset to its initial condition.

While counter 310 is counting ready C pulses, counter 318 is also counting the same C pulses. At the count of 12, which indicates that a total of seventeen C pulses have now been received, a ground output from the counter enables an AND gate 322. This gate is opened by the next C pulse following the twelve count signal, and the ground output from gate 322 triggers a blocking oscillator 323. The ground pulse which then appears in the output of oscillator 323 opens three AND gates 324, 326, and 327 which were previously enabled by the ground ONE output of the normally reset flip-flop 312. The ground output from gate 324 now opens AND gate 317 which was previously enabled by the ground ZERO output of the flip-flop 311. This action produces a ground signal which sets memory flip-flop 313 to indicate that enough ready C pulses have been counted and that the ready-start detector 300 should proceed with its normal operation.

Accordingly, the positive ONE output of flip-flop 313 is applied as an enabling signal to mark gate 308. The ground ZERO output of flip-flop 313 enables an additional AND gate 328. A ground output from gate 326 had previously attempted to open gate 328 prior to the appearance of a ground at the ZERO output of flip-flop 313. However, by the time that ground ZERO output occurred the output pulse from blocking oscillator 323 had terminated and gate 326 is no longer enabled. The ground ZERO output from flip-flop 313 is, however, applied to open a permanently enabled AND gate 330 to trigger blocking oscillator 314. This oscillator output opens the permanently enabled reset gates 331 and 332 of pulse counters 310 and 318, respectively, thereby causing those counters to be reset to their zero count conditions.

It may be noted at this point that since six ready C pulses have been counted in an interval when twelve C pulses occurred, which interval was preceded by five successive C pulses, it is assumed that four ready bits will occur even though the additional seven ready C pulses have not been counted. This gives a leeway of 3½ ready frequency cycles which may be lost as a result of noise or other interferring influences without disturbing the detection of the sequence of ready pulses.

If less than eleven ready C pulses have been counted for one reason or another by the time that the twelve count output from C-pulse counter 318 triggers blocking oscillator 323, the flip-flop 311 will not have been set; and gate 317 is not enabled. Flip-flop 313 remains in its reset condition with its ground ONE output inhibiting mark gate 308. Thus, no signal is given that the ready portion of the ready-start combination has been detected. Gate 326 is opened by the pulse from blocking oscillator 323, but gate 328 is still blocked by the positive ZERO output of flip-flop 313. However, AND gate 327 is also enabled and opened by the outputs of blocking oscillator 323 and flip-flop 312. Accordingly, it opens AND gate 333 which had been previously enabled by the ground ONE output of flip-flop 311 since that flip-flop still remains in its normal reset condition because the required eleven ready C pulses had not been counted. Now the ground output from gate 333 is coupled back to the set input of ready-start enable flip-flop 307 and sets that circuit. As a result, the ground ZERO output of flip-flop 307 blocks mark and ready gates 308 and 309, and opens a permanently enabled AND gate 334 to trigger blocking oscillator 314 for resetting counters 310 and 318. The ground ZERO output of flip-flop 307 also opens gates to permit the next succeeding C pulse to reset memory flip-flops 311, 312, and 313 to be ready for examining the next series of C-pulse intervals for a ready-start code combination.

Assuming, however, that the proper number of ready C pulses were counted in the initial interval measured by C-pulse counter 318, flip-flop 307 remains in its reset condition. Counters 310 and 318 are reset, ready gate 309 is inhibited and mark gate 308 receives a positive enabling signal from the positive ONE output of flip-flop 313. Ready-start detector circuit 300 is now ready to check for the next portion of the ready-start code combination which is the series of four mark bit-intervals.

In this part of the circuit operation, C pulses open AND gate 319 for advancing the C-pulse counter 318 in the same fashion previously described for now measuring a time interval during which a predetermined number of mark C pulses must be detected in order to meet the requirements for a ready-start signal. A mark bistable 336 in FIG. 7 is reset by the application of each C pulse through a permanently enabled gate 337. At program time Pr 31, the set gate for bistable 336 is opened by the 96 kc. clock pulse and sets the bistable. A positive ONE signal from the bistable is applied as an enabling input for mark gate 308 in FIG. 9. In addition, the same positive ONE signal is coupled back through an amplifier 338 in FIG. 6 with no phase inversion for disabling AND gate 226 which normally supplies 96 kc. advance pulses to program counter 201. From this point on in each C-pulse interval the ready-start circuit operates without the benefit of program signals so the program is inhibited.

Figure 9:
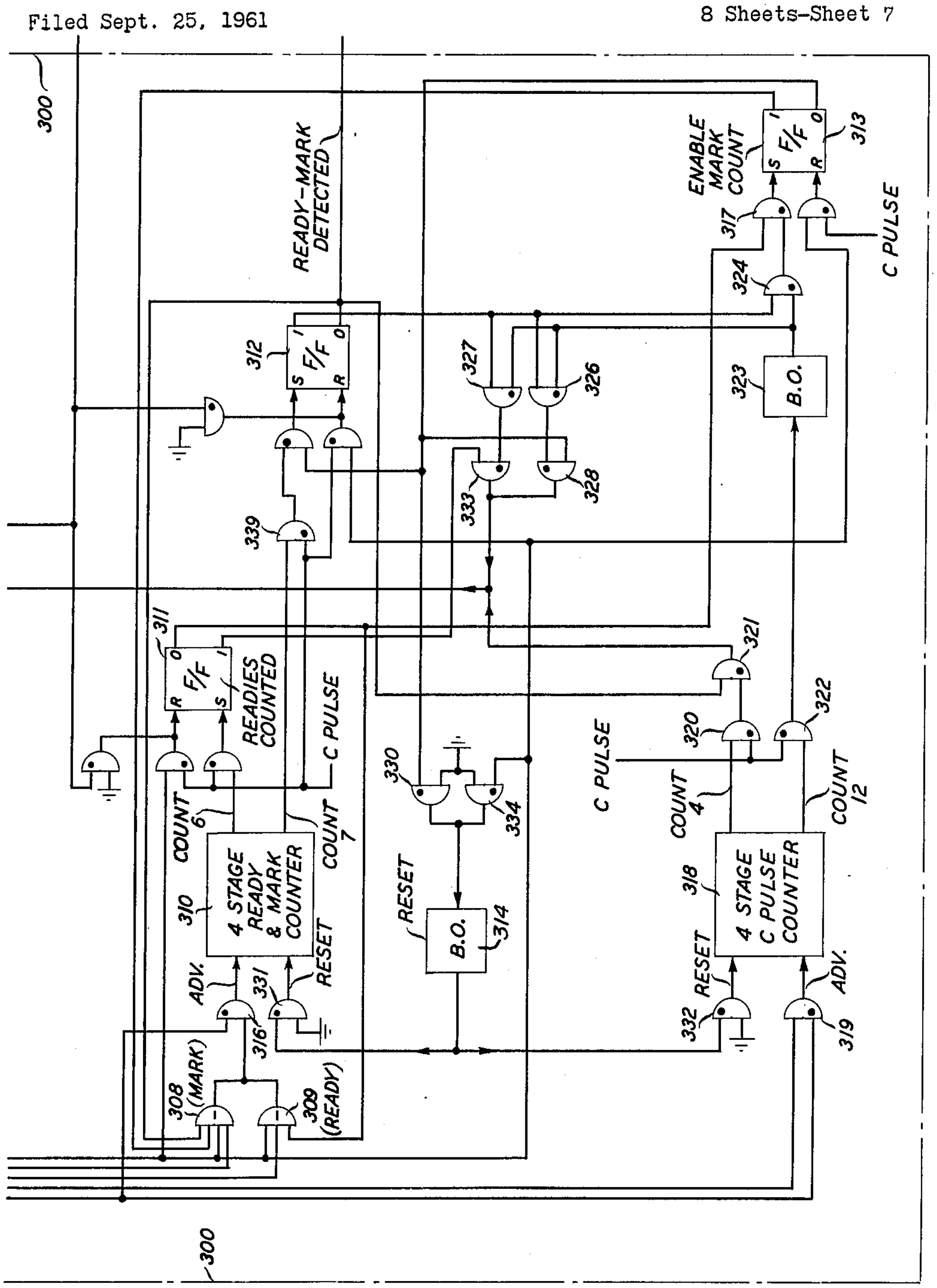

Mark gate 308 in FIG. 9 receives an additional enabling input signal from the positive ZERO output of memory flip-flop 312 which is normally in its reset condition, as has been described. A final enabling signal for gate 308 is provided by the positive ONE output of flip-flop 313, which indicates that sufficient readies have been counted and that mark C pulses should now be counted.

When fully enabled by each of the positive ONE outputs from mark flip-flop 336, gate 308 has a ground signal at its output and this ground enables AND gate 316 to couple C pulses for advancing ready and mark counter 310. Counter 310 advances in response to the C pulses until it attains a count level of six and its six count ground output enables the set gate of flip-flop 311 once more. However, this flip-flop has already been placed in its set condition by the counting of ready C pulses so no further change takes place in its condition at this time.

The next C pulse advances counter 310 to the seven count level, and it now produces another ground output signal which enables AND gate 339. A following C pulse opens gate 339 which causes the opening of a set gate for flip-flop 312. That set gate had been enabled by the ground ZERO output of flip-flop 313 and causes flip-flop 312 to be set. A ground ZERO output from the flip-flop indicates to the timing and phase control circuit of FIG. 10 that the ready-mark portion of the ready-start signal has been detected. The same ground ZERO output is also coupled back to disable mark gate 308 and prevent the further counting of mark C pulses by counter 310. In addition, the ground ZERO output of flip-flop 312 enables AND gate 321 in the output of C-pulse counter 318 for a purpose which will be described.

Since seven mark C pulses have now been counted, it is assumed that the other seven C pulses, which are required to make up the fourteen that normally appear during the four hit-intervals of mark frequency, have either appeared already and been suppressed by noise or they will appear and could be detected if the ready-start detector were left in operation.

C-pulse counter 318 continues counting C pulses as before until it reaches count level twelve, and it then enables AND gate 322 for coupling a C-pulse to trigger blocking oscillator 323. At this time AND gates 324, 326, and 327 are all disabled by the positive ONE output of flip-flop 312 which is now in its set condition. Accordingly, no change takes place in the condition of flip-flops 313 and 307. However, if an insufficient number of mark C pulses had been counted at this time, gate 326 would be enabled and would open gate 328 for resetting ready-start enable flip-flop 307 to restore the ready-start detector to its initial condition to look for a new ready-start code combination.

Figure 10:
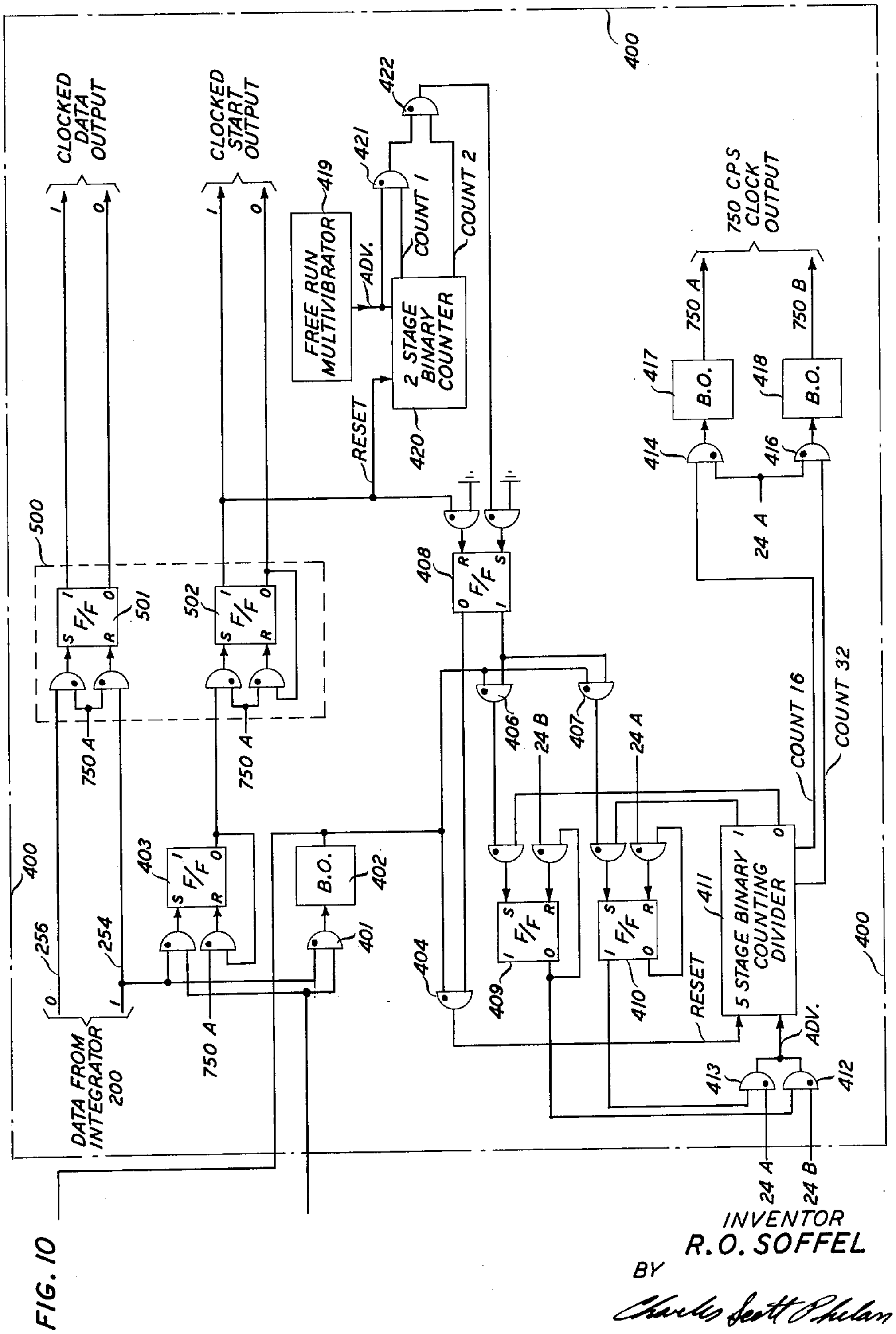

When the correct numbers of ready and mark intervals have been counted, a ground ZERO output from flip-flop 312 is coupled as described to the timing and phase control circuits of FIG. 10, and it there enables AND gate 401. The latter gate is opened by the next succeeding space signal from data counter 210 and triggers a blocking oscillator 402 for supplying a ground reset signal to the permanently enabled set gate of ready-start enable flip-flop 307. This flip-flop then produces its ground ZERO output which resets the ready-start detector circuit as has been previously discussed. In addition, the ground reset signal from blocking oscillator 402 also opens permanently enabled reset gates for flip-flops 311 and 312 as an additional precaution to be certain that the ready-start detector circuit is reset at the proper time.

If a ground rese signal should fail to be returned from the timing and phase control circuits after flip-flop 312 had been set to indicate that the ready-mark combination had been detected, ready-start detector 300 continues to operate. C-pulse counter 318 continues to count C pulses until it has recycled itself and counted up to the count of four once more. This counter now produces a ground output at the four count which enables AND gate 320 to be opened by the next succeeding C pulse. It will be recalled that AND gate 321 was enabled by the ground ZERO output of flip-flop 312. This gate is now opened by the ground output from gate 320 and provides a ground signal to the set input of flip-flop 307 for initiating the return of the ready-start detector circuit to is initial rest condition.

*Timing and phase control—FIG. 10*

Timing and phase control circuits shown in FIG. 10 comprise the data-timing synchronizer 400 which was briefly discussed in connection with FIG. 1. This circuit receives complementary data signals on leads 254 and 256 from data counter 210 in FIG. 8. Also received is a ground signal from the ready-start detector 300 to indicate that the ready-mark portion of the ready-start signal has been detected and that the data and timing synchronizer should look for a space bit. When that space bit is received, the circuits of FIG. 10 go into operation for producing 750 cycles per second clock pulses of two phases indicated as 750A and 750B clock output pulses. In addition, the timing and phase control produces the regenerated, or sampled, data at the output of sampling gate 500 and also produces a start pulse. All of the mentioned outputs are on separate circuits and are in synchronism with the 750A and 750B clock signals.

The complementary data signals on leads 254 and 256 are applied to enable set and reset gates of a sampling flip-flop circuit 501 under the control of the aforementioned 750A clock signals.

The first ground signal appearing on lead 254 after the ready-mark ground is received from ready-start detector 300 opens the set gate of a flip-flop circuit 403 to produce a ground ZERO output to the enabling input of a set gate for a flip-flop 502 in the sampling gate 500. Flip-flop 502 is set by the next succeeding 750A clock pulse to reproduce in its output circuit the start pulse. The second succeeding 750A clock pulse causes flip-flops 403 and 502 to be reset through reset gates which had been enabled by the ground ZERO outputs of the respective flip-flop circuits. This action forces the start pulse to occupy a single time slot and no more.

As previously described, the first ground on lead 254 after the reception of the ready-mark-detected signal constitutes the single bit of space in the ready-start code and opens gate 401 for triggering blocking oscillator 402. The output from this oscillator tends to open three AND gates 404, 406, and 407. Gates 406 and 407 are normally enabled by the ground ONE output of a flip-flop circuit 408 which will be further described. The positive ZERO output of the same flip-flop tends at the same time to block gate 404. Ground outputs at this start pulse time are applied from gates 406 and 407 for opening the set gates of two flip-flop circuits 409 and 410. These flip-flop circuits normally stand in the reset condition in the absence of start pulses as a result of the application of 24A and 24B clock pulses applied to their reset gates which are enabled by the respective ZERO outputs of the flip-flops.

A five-stage frequency dividing binary counter 411 has its last stage ONE and ZERO outputs connected to enabling input circuits for the set gates of flip-flops 409 and 410. This arrangement causes one of these set gates to be normally enabled while the other is disabled. Accordingly, when gates 406 and 407 are opened at the time of occurrence of a start pulse, one of the flip-flop circuits 409 or 410 is set. Flip-flop 409 in its set condition is arranged to advance the operation of frequency dividing counter 411 by one additional count. On the other hand, the ONE output of flip-flop circuit 410 is applied to AND gate 413 for retarding the operation of counter 411 by one count.

Counter 411 is normally advanced by the application of 24A clock signals through AND gate 413 which is enabled by the normally reset flip-flop 410. When a start pulse occurs, if it is assumed that the output of counter 411 is in the ground ZERO condition, flip-flop circuit 409 is set and provides a ground ZERO output for enabling AND gate 412. Gate 412 is opened by a 24B clock pulse to insert an additional advance pulse between the usual 24A advance pulses. This steps the operation of counter 411 ahead by one-half cycle of the 24 kilocycle per second rate and results in a phase shift in the output of counter 411 of one thirty-second of an output cycle.

If it is assumed, on the other hand, that counter 411 has its last stage in a ground ONE output condition, flip-flop circuit 410 is set, and its positive ONE output disables AND gate 413 to block the application of a single 24A clock pulse to counter 411. This action retards the operation of counter 411 by one count.

Immediately after an advance or retard adjustment in the phase of counter 411 a 24B clock pulse resets flip-flop 409 and a 24A pulse resets flip-flop 410 as previously mentioned. Gates 406 and 407 are then disabled because no further output grounds are supplied from blocking oscillator 402 until another start pulse in coincidence with a ready-mark ground from ready-start detector 300 is applied to the oscillator. Counter 411 then continues operating in its normal fashion but either advanced or retarded by one thirty-second of a cycle at its output signal for the balance of the incoming data word. The next detected start signal enables gates 406 and 407 once more to compare the output condition of counter 411 with the phase of the data start pulse and initiates an advance or a retard in the phase of counter 411 depending upon whether the output stage of the counter is in its set or reset condition.

Logic circuits in counter 411 are provided for deriving output signals at count 16 and count 32 in the usual manner. These signals enable input gates 414 and 416 for coupling 24A clock pulses to trigger blocking oscillators 417 and 418. At the output of each of these oscillators a 750 cycles per second signal appears since counter 411 is a five-stage binary counter and each of its output count signals occurs only once during a complete cycle of counter operation. Oscillator 417 produces its output pulses in response to the count 16 and its output is therefore designated "750A." In like manner, the output of oscillator 418 is designated "750B." These output clock signals may be used in other equipment that is associated with the demodulator and their phase is repeatedly adjusted as described to be in step with the appearance of start pulses applied on the data input leads 254 and 256 from data integrating circuit 200. Furthermore, the 750A clock signal is applied to the input gates of sampling flip-flops 501 and 502 as a further synchronizing control for the data and start outputs of the demodulator.

Since it may sometimes happen that for one reason or another start pulses may not be available to the timing and phase control circuit 400, logic is provided for detecting this condition and placing the phase control circuits of counter 411 in such a condition that upon the occurrence of the very first start pulse which is next received this counter may begin to operate immediately in a synchronized condition. Flip-flop circuit 408 is normally reset by the ground ONE output from gating flip-flop 502 following each start pulse. A free-running low frequency oscillator, such as the multivibrator 419, is provided to count off word intervals for use in detecting the absence of a start pulse. Multivibrator 419 may operate at a low frequency such as five cycles per second and have any of the well known configurations for a free-running multivibrator.

Output pulses from multivibrator 419 advance a two-stage binary counter 420 which is reset by the ground ONE output of flip-flop 502 following a start pulse in the same fashion that flip-flop 408 is also reset. However, in the absence of start pulses AND gates 421 and 422 are both enabled when counter 420 reaches a count of three thereby indicating that approximately three data blocks have been transmitted with no start pulse. The next pulse from multivibrator 419 causes a ground pulse to appear at the output of gate 422 which opens the permanently-enabled set gate of flip-flop 408 for blocking gates 406 and 407. Furthermore, the ground ZERO output of flip-flop 408 now enables AND gate 404 in the reset circuit of frequency divider 411.

The first-occurring start pulse is coupled through gate 404 to reset counter 411 to the zero count condition. Operation of the timing and phase control circuit of FIG. 10 continues thereafter in the manner described, with counter 411 having its phase adjusted by a small increment at the beginning of each word. This adjustment at each start pulse constitutes a small advance and a small retard on alternate words as long as the counter 411 stays approximately in step with the start pulses. Such adjustments amount to only about ten electrical degrees and occur only once in each data word so that they are hardly perceptible in the form of jitter.

Although this invention has been described in connection with a particular embodiment thereof it is to be understood that additional embodiments and modifications which will be obvious to those skilled in the art are included within the spirit and scope of the invention.

What is claimed is:

1. A digital demodulator comprising means receiving frequency-shift signals including alternating-current waves at different frequencies representing different data bits, means generating control pulses in response to zero-voltage wave transitions of said alternating-current waves, a circuit measuring durations of time intervals between said control pulses, and logic circuits connected to said measuring circuit for generating a single electric signal representing each data bit as a function of said durations.

2. A digital demodulator comprising means receiving frequency-shift data signals including successive bursts of alternating-current waves of different frequencies representing different data bits, means generating a control pulse in response to each zero-voltage wave transition of said waves, and a digital integrator responsive to the durations of the intervals between successive control pulses for generating different data signals each corresponding to one of said frequencies.

3. A digital data demodulator comprising means receiving frequency-shift signals representing amplitude-coded data signal hits, and a digital equivalent low-pass filter connected to said receiving means for reproducing data pulse amplitude transitions in response to frequency changes in said frequency-shift signals.

4. A digital data demodulator comprising means receiving frequency-shift keyed data signals, means generating control pulses in response to predetermined repetitive characteristics of each cycle of said signals, each pair of said control pulses defining the beginning and the ending of a control interval, a source of multifrequency local oscillations, a first reversible binary counter counting cycles of a first oscillation frequency from said source during a first part of each of said control intervals, a second reversible binary counter, means responsive to the count attained in said first counter at the end of said first part coupling a selected frequency from said source for driving said second binary counter in the same direction as said first binary counter, means operable in a second part of each of said intervals transferring the count of said second counter to said first counter, and means deriving pulses representative of said data signals from said second counter.

5. A digital demodulator comprising means receiving frequency-shift data signals, means generating control pulses in response to predetermined repetitive characteristics of each cycle of said signals, each pair of control pulses defining the beginning and the ending of a control interval, a source of multifrequency oscillations, each of said oscillations having a higher frequency than any of the data frequencies in said signals, a first binary counter counting oscillations of a first frequency from said source, logic circuits deriving control signals from said first counter in response to different count levels therein for controlling the operation of said demodulator between said control pulses in accordance with a predetermined program, a first reversible binary counter counting oscillations at said first frequency during a first part of each of said intervals, a second reversible binary counter, selecting means coupling different frequencies from said source to drive said second reversible binary counter in a selectable direction, and means connecting said program logic to said reversible binary counters and said selecting means for successively transferring the count from said second reversible binary counter to said first reversible binay counter, reading out the count in said first binary counter after the end of said first part of each interval, and driving said second reversible binary counter in the same direction as said first reversible binary counter and at a frequency which is a function of the count magnitude in said first reversible binary counter.

6. A digital data demodulator comprising means receiving frequency-shift signals, a control pulse generator responsive to said signals for generating pulse-defining time intervals between zero-voltage axis crossings of said signals, a data counter, a source of plural oscillations of different frequencies, means connected to said control pulse generator and responsive to changes in the durations of said intervals for selecting different frequencies from said source as a function of magnitudes of said changes, means coupling the selected ones of said different frequencies to drive said counter, and means deriving pulse data from said counter.

7. A demodulator for frequency-shift signals having at least two different modulation conditions, said demodulator comprising means responsive to a change from one of said conditions to another one thereof generating output voltages indicating the amount and direction of said change, a reversible data counter, a multifrequency source of oscillations, selecting means responsive to said output voltages and applying to said counter one of said frequencies which has a magnitude corresponding to the magnitude of said change, said selecting means being adapted for driving said counter at said selected frequency and in a direction to adjust the count thereof in the same direction as said change.

8. In a frequency-shift data transmission system wherein data information bits of different types are represented by bursts of electric oscillations of a corresponding number of different frequencies, said oscillations being asynchronous with respect to said data bits, a digital low-pass filter receiving said bursts and producing in response thereto a direct-current envelope wave having different amplitudes corresponding to the different frequencies of said bursts, said filter including means indicating the instant of each transition between said frequencies with reference to zero-voltage axis crossings of said oscillations.

9. In a frequency-shift data transmission system wherein data bits are represented by bursts of electric oscillations of different frequencies and the beginning of each block of data is marked by a ready-start code word comprising a predetermined combination of mark, space, and ready bit frequencies, means producing two control pulses for each cycle of said oscillations, means responsive to changes in durations of intervals between said control pulses for generating corresponding data pulses, a source of local oscillations at a frequency which is much higher than any of the frequencies of said bursts of oscillations, first means counting said local oscillations during each of said intervals between control pulses to measure the duration of the period of the corresponding burst oscillation, means deriving from said first counting means separate signal voltages for measured periods of ready frequency and of mark frequency, second means counting said control pulses for a predetermined time interval, third means connected to said deriving means and counting control pulses of a first one of said ready or mark frequencies up to a predetermined number and then counting control pulses of the other one of said ready or mark frequencies up to a predetermined number, means responsive to the attainment of said predetermined counts of said ready and mark signals enabling the production of a data start pulse, data utilization means, and means responsive to said start pulse enabling said utilization means to receive said data pulses.

10. A demodulator for converting blocks of frequency-shift keyed data signals into corresponding pulse data signals preceded by a start signal, said demodulator comprising means receiving said frequency-shift keyed signals, means responsive to changes in the period length of successive cycles of said frequency-shift keyed signals generating data signal transitions, a source of local oscillations of stable frequency, means dividing down the frequency of said local oscillations to a predetermined clock frequency, and means synchronizing said clock frequency with said data signal transitions, said synchronizing means comprising a phase comparing circuit, means applying the data signal transition representing said start pulse to said comparing circuit, means applying to said comparing circuit a signal representing the status of said frequency dividing means, said comparing circuit producing a first signal if said transition leads said status signal and producing a second signal if said status signal leads said transition, and means responsive to said first and second signals advancing or retarding the operation of said frequency dividing means by one period of said local oscillations.

11. A digital demodulator comprising means receiving frequency-shift keyed bits of data comprising mark and space bits represented by electric signal oscillation bursts of different frequencies for each different data bit type, said data bits being asynchronous with respect to the oscillations of said frequencies, a digital low-pass filter connected to said receiving means and comprising a first binary counter, a second binary counter that may count forward or in reverse, means during each half cycle of said oscillation bursts transferring the count from said second counter to said first counter, means driving said first counter at a rate which is much higher than the frequency of any of said bursts of oscillations, means driving said second counter at a variable rate controlled by said first counter, means stopping said first counter at the end of said half cycle, means selecting a drive rate for said second counter at a value which is a first function of the condition of said first counter, and means selecting the direction of drive for said second counter to be either forward or reverse in accordance with a different function of the condition of said first counter.

12. A demodulator for frequency-shift data signals, said demodulator comprising a counter, means driving said counter at a predetermined frequency, means responsive to said frequency shift data signals generating control pulses with interpulse spacing which is indicative of the frequency of each cycle of said frequency shift signals, means applying said control pulses to stop operation of said counter, means connected to said counter for generating signals which are indicative of the immediate previous history of interpulse interval durations, and means responsive to said interval duration history signals fixing an initial count level for said counter after each of said control pulses.

References Cited by the Examiner

UNITED STATES PATENTS

| | | | |
|---|---|---|---|
| 2,925,555 | 2/1960 | Gordon | 340—347 X |
| 2,950,471 | 8/1960 | Hoeppner | 340—347 |
| 3,121,197 | 2/1964 | Irland | 325—30 |

OTHER REFERENCES

Susskind: "Notes on Analog-Digital Conversion," 1957, pp. 6.8–6.12.

DAVID G. REDINBAUGH, *Primary Examiner.*

MALCOLM A. MORRISON, *Examiner.*